United States Patent
Baechle

(10) Patent No.: US 10,087,018 B2
(45) Date of Patent: Oct. 2, 2018

(54) TRANSPORTING APPARATUS FOR A PACKAGING MACHINE

(71) Applicant: Robert Bosch GmbH, Stuttgart (DE)

(72) Inventor: Andreas Baechle, Rickenbach (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 15/535,141

(22) PCT Filed: Oct. 27, 2015

(86) PCT No.: PCT/EP2015/074829
§ 371 (c)(1),
(2) Date: Jun. 12, 2017

(87) PCT Pub. No.: WO2016/091446
PCT Pub. Date: Jun. 16, 2016

(65) Prior Publication Data
US 2017/0341875 A1 Nov. 30, 2017

(30) Foreign Application Priority Data
Dec. 11, 2014 (DE) .......................... 10 2014 225 529

(51) Int. Cl.
*B65G 19/02* (2006.01)
*B65G 47/28* (2006.01)
(Continued)

(52) U.S. Cl.
CPC .............. *B65G 47/28* (2013.01); *B65B 41/02* (2013.01); *B65B 41/08* (2013.01); *B65B 43/126* (2013.01);
(Continued)

(58) Field of Classification Search
CPC ........ B65G 47/28; B65G 19/02; B65G 19/00; B65G 54/02; B65G 19/26; B65G 23/23;
(Continued)

(56) References Cited

U.S. PATENT DOCUMENTS

| 3,047,132 A | 7/1962 | Willi |
| 9,604,795 B2 * | 3/2017 | Aunnann ............... B65G 54/02 |

(Continued)

FOREIGN PATENT DOCUMENTS

| DE | 69910973 | 9/2004 |
| DE | 10360082 | 7/2005 |

(Continued)

OTHER PUBLICATIONS

International Search Report for Application No. PCT/EP2015/074829 dated Dec. 17, 2015 (English Translation, 3 pages).
(Continued)

*Primary Examiner* — Mark A Deuble
(74) *Attorney, Agent, or Firm* — Michael Best & Friedrich LLP

(57) ABSTRACT

The invention proceeds from a transporting apparatus for a packaging machine, for transferring pack groups, in particular groups of cardboard boxes and/or cardboard blanks, along a transporting route from at least a first pack-group arrangement in a first transporting-route portion into at least one further pack-group arrangement in at least one further transporting-route portion, wherein the first pack-group arrangement and the at least one further pack-group arrangement are spaced apart internally in each case by different distances, having at least two transporting units, which can be driven independently in a movement plane along the transporting route, at least between the first transporting-route portion and the further transporting-route portion, in a transporting direction and in a return direction, which is counter to the transporting direction, wherein the transporting units each have at least one driving element, by means of which, in at least one operating state, the respective transporting unit is coupled to a pack of the pack group which is to be transferred, at least during transfer from the (Continued)

first transporting-route portion into the at least one further transporting-route portion. It is proposed to mount the driving elements on the transporting units in each case such that, in a force-fitting and/or form-fitting manner, they can be coupled to the pack which is to be coupled to the respective transporting unit, and uncoupled therefrom, in one movement, in each case independently of the at least one driving element of the at least one further transporting unit.

10 Claims, 11 Drawing Sheets

(51) Int. Cl.
  *B65B 41/02* (2006.01)
  *B65B 41/08* (2006.01)
  *B65B 43/48* (2006.01)
  *B65G 19/26* (2006.01)
  *B65B 43/12* (2006.01)
  *B65G 54/02* (2006.01)

(52) U.S. Cl.
  CPC .............. *B65B 43/48* (2013.01); *B65G 19/02* (2013.01); *B65G 19/26* (2013.01); *B65G 54/02* (2013.01)

(58) Field of Classification Search
  CPC ......... B65B 43/48; B65B 41/08; B65B 35/40; B65B 41/02; B65B 43/12; B65B 25/08
  USPC ........................................................ 198/619
  See application file for complete search history.

(56) References Cited

U.S. PATENT DOCUMENTS

| | | | |
|---|---|---|---|
| 2003/0136086 A1 | 7/2003 | Kalany et al. | |
| 2010/0084247 A1* | 4/2010 | Wipf | B65G 19/02 198/617 |
| 2012/0018282 A1* | 1/2012 | Loecht | B65G 19/02 198/725 |
| 2013/0247524 A1 | 9/2013 | Ford et al. | |
| 2015/0136564 A1* | 5/2015 | Hurni | B65B 57/16 198/418 |
| 2016/0289010 A1* | 10/2016 | Wipf | B65G 19/02 |
| 2016/0347549 A1* | 12/2016 | Beesley | B65G 23/26 |

FOREIGN PATENT DOCUMENTS

| | | |
|---|---|---|
| DE | 102005017509 | 6/2006 |
| DE | 102012210329 | 12/2013 |
| DE | 102013105175 | 11/2014 |
| EP | 2634100 | 9/2013 |
| WO | 2013189656 | 12/2013 |

OTHER PUBLICATIONS

"On the Rail: Motion Control," All-electronics.de, Mar. 27, 2013, Retrieved from Internet <URL: http://www.all-electronics.de/texte/anzeigen/49979/Auf-die-Schiene-gesetzt> (English Translation and Original, 4 pages).

Beckhoff, "New Automation Technology. Maximum efficiency and flexibility: PC-based control for the packaging industry," May 5, 2014, Retrieved from Internet <URL: https://download.beckhoff.com/download/Document/catalog/Beckhoff_Packaging_Industry.pdf>.

* cited by examiner

TRANSPORTING APPARATUS FOR A PACKAGING MACHINE

BACKGROUND OF THE INVENTION

A transporting apparatus for a packaging machine, for transferring pack groups, in particular groups of cardboard boxes and/or cardboard blanks, along a transporting route from at least a first pack-group arrangement in a first transporting-route portion into at least one further pack-group arrangement in at least one further transporting-route portion, wherein the first pack-group arrangement and the at least one further pack-group arrangement are spaced apart internally in each case by different distances, having at least two transporting units, which can be driven independently in a movement plane along the transporting route, at least between the first transporting-route portion and the further transporting-route portion, in a transporting direction and in a return direction, which is counter to the transporting direction, wherein the transporting units each have at least one driving element, by means of which, in at least one operating state, the respective transporting unit is coupled to a pack of the pack group which is to be transferred at least during transfer from the first transporting-route portion into the at least one further transporting-route portion.

SUMMARY OF THE INVENTION

The invention proceeds from a transporting apparatus for a packaging machine, for transferring pack groups, in particular groups of cardboard boxes and/or cardboard blanks, along a transporting route from at least a first pack-group arrangement in a first-transporting route portion into at least one further pack-group arrangement in at least one further transporting-route portion, wherein the first pack-group arrangement and the at least one further pack-group arrangement are spaced apart internally in each case by different distances, having at least two transporting units, which can be driven independently in a movement plane along the transporting route, at least between the first transporting-route portion and the further transporting-route portion, in a transporting direction and in a return direction, which is counter to the transporting direction, wherein the transporting units each have at least one driving element, by means of which, in at least one operating state, the respective transporting unit is coupled to a pack of the pack group which is to be transferred at least during transfer from the first transporting-route portion into the at least one further transporting-route portion.

It is proposed to mount the driving elements on the transporting units in each case such that, in a force-fitting and/or form-fitting manner, they can be coupled to the pack which is to be coupled to the respective transporting unit, and uncoupled therefrom, in one coupling movement, in each case independently of the at least one driving element of the at least one further transporting unit.

In this context, a "pack group" is particularly to be understood as a plurality of packs such as packaging containers and/or packaging container blanks. A "packaging container blank" is particularly to be understood in this context as a blank from flat material, from which a packaging container is formed by shaping and/or folding. The packs can preferably be formed from cardboard boxes and/or cardboard blanks. The cardboard blanks are preferably designed as flat blanks. The flat blanks are preferably are preferably formed from flat cardboard material, which has impressed folding lines. The folding lines reduce a bending moment of the flat blank transversely to the folding line and facilitate a precise erection of the flat blank. The cardboard boxes are preferably constructed from the cardboard blanks by erection. "Erection" is to be understood in this context as a process that is known to the person skilled in the art, in which the cardboard box is formed from the cardboard blanks by folding and gluing.

A "pack-group arrangement" is to be understood in this context as a number of packs, which are disposed in an arrangement. The packs can particularly be disposed in the direction of the transporting route so as to be uniformly spaced apart from one another. "Spaced apart from one another" is to be understood in this context as a distance, at which the packs are disposed in the separation direction, in this case in the direction of the transporting route. The separation is preferably measured from a middle plane of a pack that is perpendicular to the separation direction up to a middle plane, which is oriented in the same direction, of the next pack in the separation direction. A "transporting-route portion" is to be understood in this context particularly as a route portion of the transporting route, in which the packs are disposed in a particular pack-group and/or are to be disposed by the transporting apparatus. The transporting route has at least one first and further transporting-route portion. In particular, the packs can be delivered in the first transporting-route portion in the first pack-group arrangement. The first pack-group arrangement can, for example, be spaced apart internally at a distance which corresponds to a length of the packs in the direction of transport, i.e. the packs are disposed "to impact" so that they touch one another. It is likewise possible for the packs to be brought into a shingled pack group. A "shingled pack-group arrangement refers in this context particularly to a pack-group arrangement, in which the individual packs overlap in the direction of transportation. Laterally protruding flaps, such as closing flaps, of adjacent packs can particularly be disposed in an overlapping manner. The transporting apparatus can be provided to transfer the packs into the further transporting-route portion having in each case different pack-group arrangements that are spaced apart internally in each case by different distances, so that the packs are disposed at one distance. This can, for example, facilitate a filling and/or closing of the packs. In an advantageous manner, a plurality of transporting-route portions having in each case different pack-group arrangements and being spaced apart internally in each case by different distances can be disposed along the transporting route. The transporting-route sections can be provided for the purpose of forming packaging blanks into packs, of filling the packs and/or of sealing the packs. Further types of transporting-route portions and/or further operations are also possible which can be performed in these transporting-route portions. A transporting-route portion can particularly have glue application means in order to apply glue to the packs. This operation can particularly take place before the packs are sealed in a further transporting-route portion. The transporting apparatus can be provided for the purpose of transferring the pack groups along the transporting route in the pack-group arrangement adapted in each case to the respective transporting-route portion. The transporting apparatus can be provided to transport the pack-groups and/or individual packs along the transporting route between a plurality of transporting-route portions having adapted pack-group arrangements in the transporting direction and/or in the return direction. A "movement plane" refers in this context to a plane parallel to the transporting route, along which the transporting unit moves in the transporting direction and/or in the return direction. The transporting unit is particularly mounted on the transporting-route by means of a linear mounting unit in such a way that said transporting unit can be moved in the transporting direction parallel to the movement plane. The transporting units can preferably be driven in a common movement plane. A mounting of the transporting units can be particularly easy. It is likewise possible that the transporting units can be driven in each case in deviating movement planes that are offset to one another in a vertical direction. "Couple" refers in this case to the fact that the driving element transmits a force and/or position and/or movement onto the packaging in and/or counter to the transporting direction of the transporting unit in order to drive the packaging in or counter to the transporting direction. A coupled state is to be characterized in this context in that the transporting element and the packaging coupled to the transporting element move synchronously. A "coupling movement" is to be understood in this context as a movement in which the driving element can be brought into a force-fit and/or form-fit with the respective packaging. "To mount the driving elements on the transporting units in each case such that, in a force-fitting and/or form-fitting manner, they can be coupled to the pack which is to be coupled to the respective transporting unit, and uncoupled therefrom, in one movement, in each case independently of the at least one driving element of the at least one further transporting unit" is to be particularly understood in this context by the fact that these driving elements can be coupled or decoupled in the coupling movement independently of further driving elements of further transporting units, which are provided for a coupling to a further pack. The packs can be coupled to one another independently of driving elements and/or transporting units. All driving elements are preferably mounted so that they can be driven independently of one another in the coupling movement. It is also possible in a simplified embodiment of the invention, that driving elements, which are provided to be jointly coupled to a pack in a force-fitting and/or form-fitting manner and/or decoupled, are mounted so that they can be jointly driven in the coupling movement.

The pack groups can be especially flexibly transferred from the first into the further pack-group arrangement by means of the configuration of the transporting apparatus according to the invention. The pack group arrangements can particularly be spaced apart internally by different distances. In particular, adjacent packs within the pack-group arrangement can be spaced apart internally by different distances. That means that packs of a pack-group arrangement can have different distances between them. Packs of a pack-group arrangement can have different lengths in the direction of separation. The separations can be advantageously compensated and/or produced by the driving elements being coupled to the packs and/or decoupled therefrom if the transporting units are situated in suitable positions relative to the packs. The different separations can be generated by a suitable actuation of driving units of the transport units and from coupling movements of the driving elements. Mechanical format changes for generating different spacings can be eliminated. The transporting apparatus can be particularly efficient and/or flexible.

It is further proposed that the driving elements with the packs of the pack group to be transferred can be driven independently of the position thereof along the transporting route in the coupling movement. Driving means can particularly be provided which drive the driving elements independently of the position thereof along the transporting route in the coupling movement. The coupling movement can be transmitted via articulating means onto the transporting units and/or the driving elements independent of the position. The transporting units can be coupled to the packs independently of the position thereof. The transporting apparatus can be particularly flexible. The transporting apparatus can particularly compensate very easily for deviations in the pack positions in the pack-group arrangements. The transporting apparatus can preferably have at least one sensor, which is provided to detect pack positions. At least one transporting unit can particularly have a sensor for detecting pack positions. The sensor can, for example, be an optical sensor, such as a light barrier or a proximity sensor. The transporting unit can recognize packs and/or pack positions if said unit moves by a pack in the transporting direction or in the return direction. The transporting unit can be coupled to the pack at a position matched to the pack position. A control unit of the transporting apparatus can be provided to detect the pack positions and to couple the transporting units to the packs at the adapted position. The transporting apparatus can be particularly reliable and fault-tolerant. The transport apparatus can particularly compensate for deviations in the pack positions.

In a particularly preferred manner, the transporting units have in each case at least one active driving means which is provided to drive the respectively at least one driving element of the respective transporting unit with the coupling movement. An "active" driving means is particularly to be understood in this context as a driving means that is provided to generate the coupling movement with the help of an energy conversion, such as a pneumatic cylinder or preferably an electric drive like a servo motor or preferably a solenoid. If the transporting unit has a plurality of driving elements, said driving elements can be driven by a common driving means in the coupling movement. Driving means can be saved. Each driving element advantageously has a driving means for driving the coupling movement. The driving elements can be coupled to the pack in a temporally offset manner. For example, the driving element disposed at the end of the transporting unit that faces away from the transporting direction can be initially coupled. In a next step, the transporting unit can be moved in the transporting direction, at least until the pack abuts securely against the coupled driving element. In a further step, the driving element disposed at the end of the transporting unit facing the transporting direction can be coupled. The driving elements can be securely coupled to the pack even if said pack is displaced opposite an expected target position in the transporting direction. The driving elements can be driven particularly dynamically in the coupling movement. The drive of the coupling movement can have a particularly small mass.

It is furthermore proposed that respectively two driving elements can be coupled to one of the packs to be coupled at opposite ends of the pack in the transporting direction in a form-fitting manner. A driving element can have the function of a holder and the further driving element the function of a counter holder. Holder and counter holder can exert opposite forces on the pack in the transporting direction. The two driving elements can couple the pack at least with minimum backlash. "Minimum backlash" refers in this context particularly to a spacing in the transporting direction between the two driving elements that is less than 1 mm larger, preferably less than 0.5 mm larger than the length of the pack in this direction. The coupling can transfer the position of the transporting unit particularly precisely to the pack position. The pack can preferably be clamped in the coupled state between the two driving elements. "Clamped" particularly refers in this context to that a spacing in the transporting direction between the two driving elements is somewhat smaller than the length of the pack in this direction so that the pack and/or the driving elements are lightly elastically deformed in or counter to the transport direction, and the pack exerts counter forces on the driving elements. The pack can be coupled to the transporting element particularly reliably and/or with no backlash. It can likewise be possible that the driving elements secure a pack formed from a pack blank by means of bilateral clamping. This can particularly prevent a pack, which is not yet glued or the glue of which is not yet resilient from being undesirably folded upwards.

In a particularly preferable manner, the respectively two driving elements that can be coupled to a pack in a form-fitting manner can be driven independently in the transporting direction. The driving elements can particularly be mounted on in each case their own transporting units which can be independently driven. The transporting units can preferably be driven by independent linear motors. A distance between the driving elements during clamping of packs can be particularly flexibly adjusted. In particular, the control unit of the transporting apparatus can actuate the transporting units such that they are coupled to the pack at a distance that is suitable for the pack by means of the driving elements thereof. The two transporting units which are coupled to a pack can transfer these packs in a common transporting movement.

Alternatively, the respectively two driving elements that can be coupled to a pack in a form-fitting manner can be mounted on a common transporting unit at a distance from one another that can be adjusted in the transporting direction. A format gauge can preferably be provided to adjust and/or determine the distance between the driving elements pack length. A user of the transporting apparatus can adjust and/or determine particularly easily and reliably the distance between the driving elements depending on the packs to be transferred. Drives and/or transport units can be saved with respect to an independent drive of each driving element in the transporting direction.

It is furthermore proposed that the driving elements are rotatably mounted on the transport units about an axis of rotation that is perpendicular to the transporting direction and parallel to the movement plane in the coupling movement. The coupling movement can be a rotational movement. The driving elements preferably have a main extension, which starts at the axis of rotation and is substantially parallel to the transporting direction in the coupled state, as well as a retaining finger comprising a retaining surface in an end region facing away from the axis of rotation, said retaining surface, in the coupled state, being oriented at least substantially perpendicular to the transporting direction in the direction of the pack. "At least substantially" is to be understood in this context particularly as a deviation of less than 20°, preferably less than 10°. At a particularly low construction height perpendicularly to the transporting direction, the driving elements can have a particularly large radius about the axis of rotation. The retaining surfaces can be moved around a circular track having a particularly large radius. The retaining fingers of the driving elements can be inserted particularly well into a spacing in the coupling movement between two packs. If two driving elements are provided to clamp a pack on both sides, the coupling movement can be particularly suitable in a circular movement having a large radius in order to exert a clamping force on the pack. Alternatively, the driving elements can be mounted so that they can be driven in and out in the direction of the pack in a linear coupling movement. A movement direction of the coupling movement can preferably deviate from a perpendicular to the transporting direction so that the driving elements approach the pack during a coupling operation with the coupling movement. If two driving elements are provided for the purpose of clamping a pack on both sides, the coupling movement can bring about a clamping force.

A method is further proposed for transferring pack groups, in particular groups of cardboard boxes and/or cardboard blanks along a transporting route from at least a first pack-group arrangement in a first transporting route portion into at least one further pack-group arrangement in at least one further transporting-route portion, wherein the first pack-group arrangement and the at least one further pack-group arrangement are spaced apart internally in each case by different distances, in which method at least two transporting units are driven in a common movement plane along the transporting route at least between the first transporting-route portion and the further transporting route portion, in a transporting direction and in a return direction, which is counter to the transporting direction and wherein the transporting units each have at least one driving element, by means of which a pack of the pack group which is to be transferred, at least during transfer from the first transporting-route portion into the at least one further transporting-route portion, is individually driven. It is proposed to couple, in a force-fitting and/or form-fitting manner, and/or uncouple the driving elements on the transporting units to/from the pack which is to be coupled by the respective driving element, in each case independently of one another, in one coupling movement. With the method, the first pack-group arrangement can be transferred into the further pack-group arrangement, wherein the first and the further spacing can be freely selected by a suitable actuation of the transporting units and driving elements.

It is furthermore proposed that, in a step of the method in the first transporting-route portion with the pack group in the first pack-group arrangement, at least a first driving element is coupled to a first pack of the pack group that is counter to the transporting direction; and this pack is driven in the transporting direction in the direction of the further transporting-route portion. It is further proposed that, in a further step of the method, at least one second driving element is coupled to a second pack of the pack group which is counter to the transporting direction, and this second pack is driven in the transporting direction in the direction of the further transporting-route portion. Pack-group arrangements can also advantageously be transferred from an internal spacing, which has a smaller extension in the transporting direction than a minimum distance, by which two driving elements of two transporting units can approach each other.

It is furthermore proposed that, in a further step of the method, the at least one first driving element is uncoupled from the first pack which is counter to the transporting direction and the at least one second driving element is uncoupled from the second pack which is counter to the transporting direction upon reaching the further pack-group arrangement in the further transporting-route portion. A pack-group arrangement can also be advantageously transferred into a pack-group arrangement having an internal spacing which has a smaller extension in the transporting direction than a minimum distance, by which two driving elements of two transporting units can approach each other.

It is furthermore proposed that, in a further step of the method, the uncoupled driving elements are transferred in a return direction from the further transporting-route portion into the first transporting-route portion. The transporting units comprising the driving elements can transfer the pack groups in the same movement plane in the transporting direction and be transferred in a return movement again into the first transporting-route portion. Apparatuses provided in order to return the transporting units in a return run in a further movement plane can be eliminated. The transporting apparatus can be particularly compact and/or cost-effective.

The transporting apparatus according to the invention is hereby not to be limited to the application and embodiment described above. The transporting apparatus according to the invention can particularly have a number of individual elements, components and units that deviate from the number mentioned above.

BRIEF DESCRIPTION OF THE DRAWINGS

Further advantages ensue from the following description of the drawings. Seven exemplary embodiments of the invention are depicted in the drawings. The drawings, the description and the claims contain numerous characteristics in combination. The person skilled in the art will expediently consider the features individually as well as put them together to form useful further combinations.

In the drawings.

DETAILED DESCRIPTION

Figure 1:
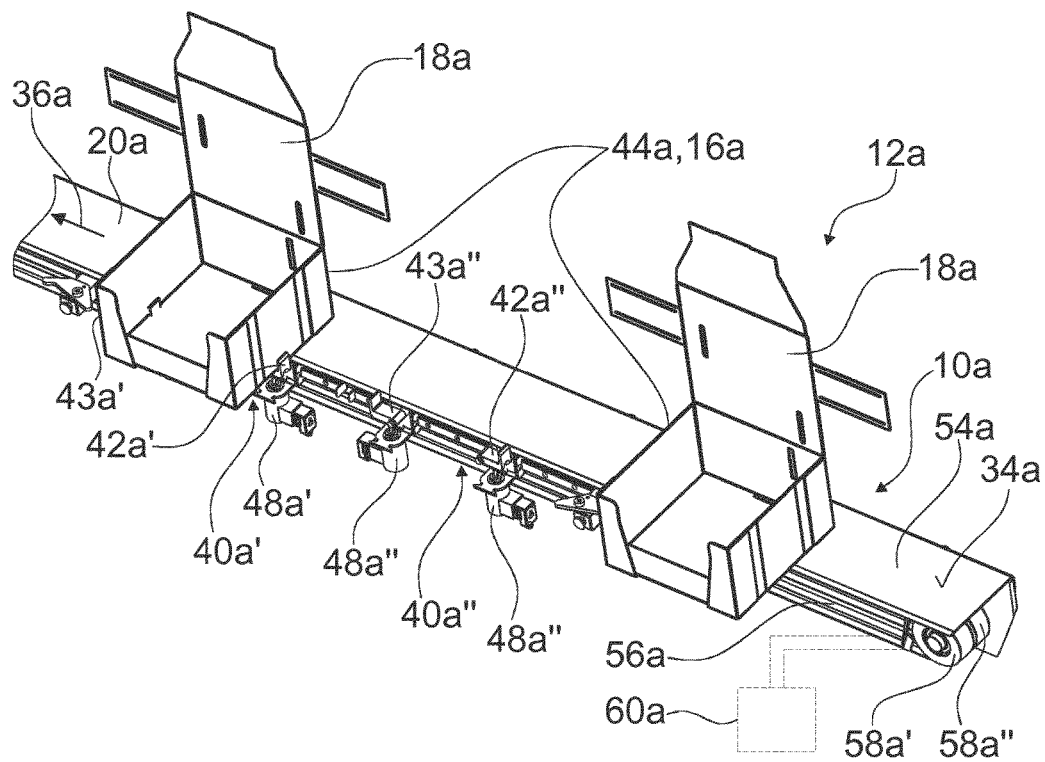
FIG. 1 shows a schematic depiction of a section of a transporting apparatus according to the invention in a first exemplary embodiment.

FIG. 1 shows a schematic depiction of a section of a transporting apparatus 10a according to the invention for a packaging machine 12a in a first exemplary embodiment.

Figure 6A:
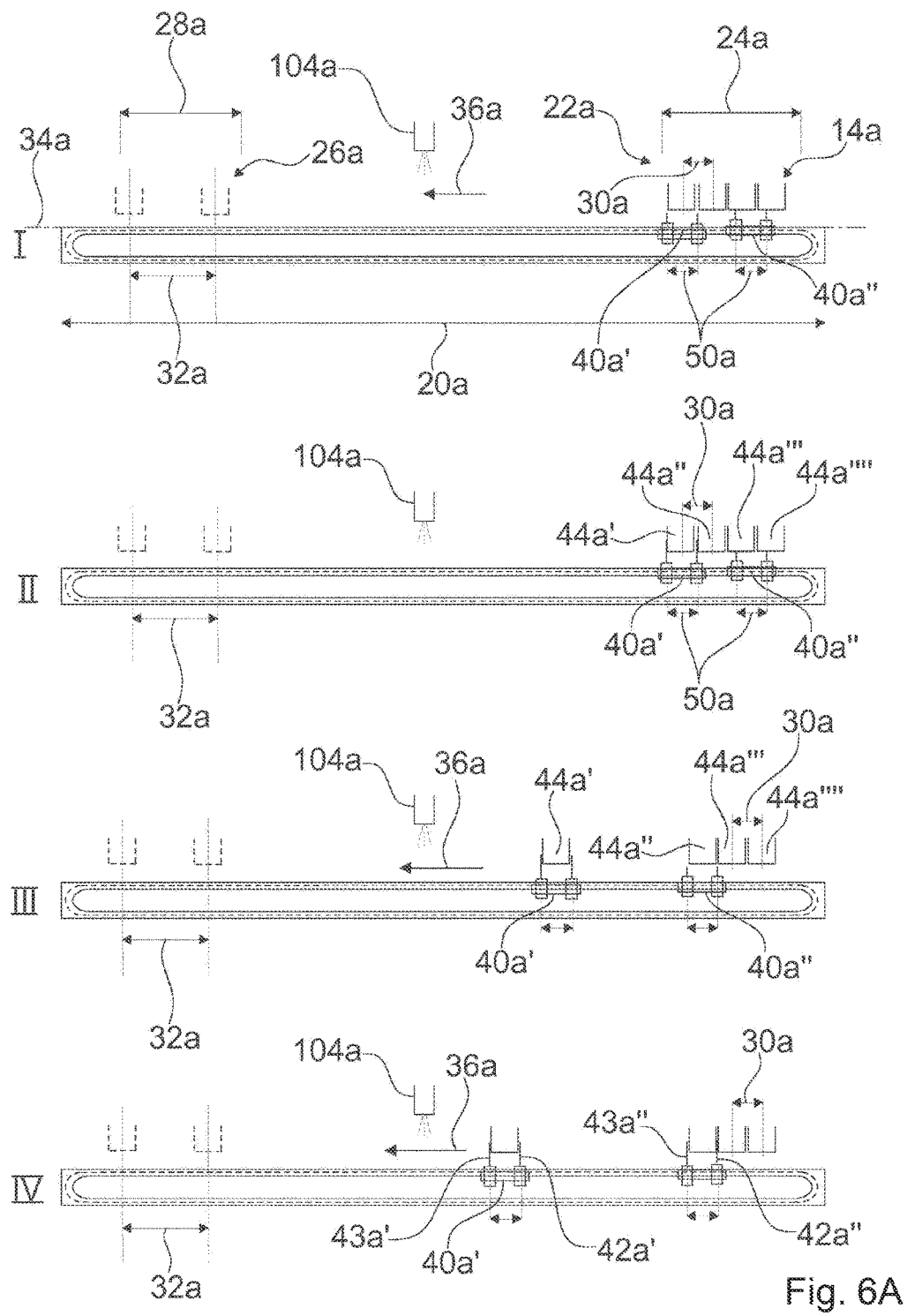
FIGS. 6A, 6B, and 6C show a depiction of steps I through XIV of a preferred method for transferring a pack group with the transporting apparatus of the first exemplary embodiment.
Figure 6B:
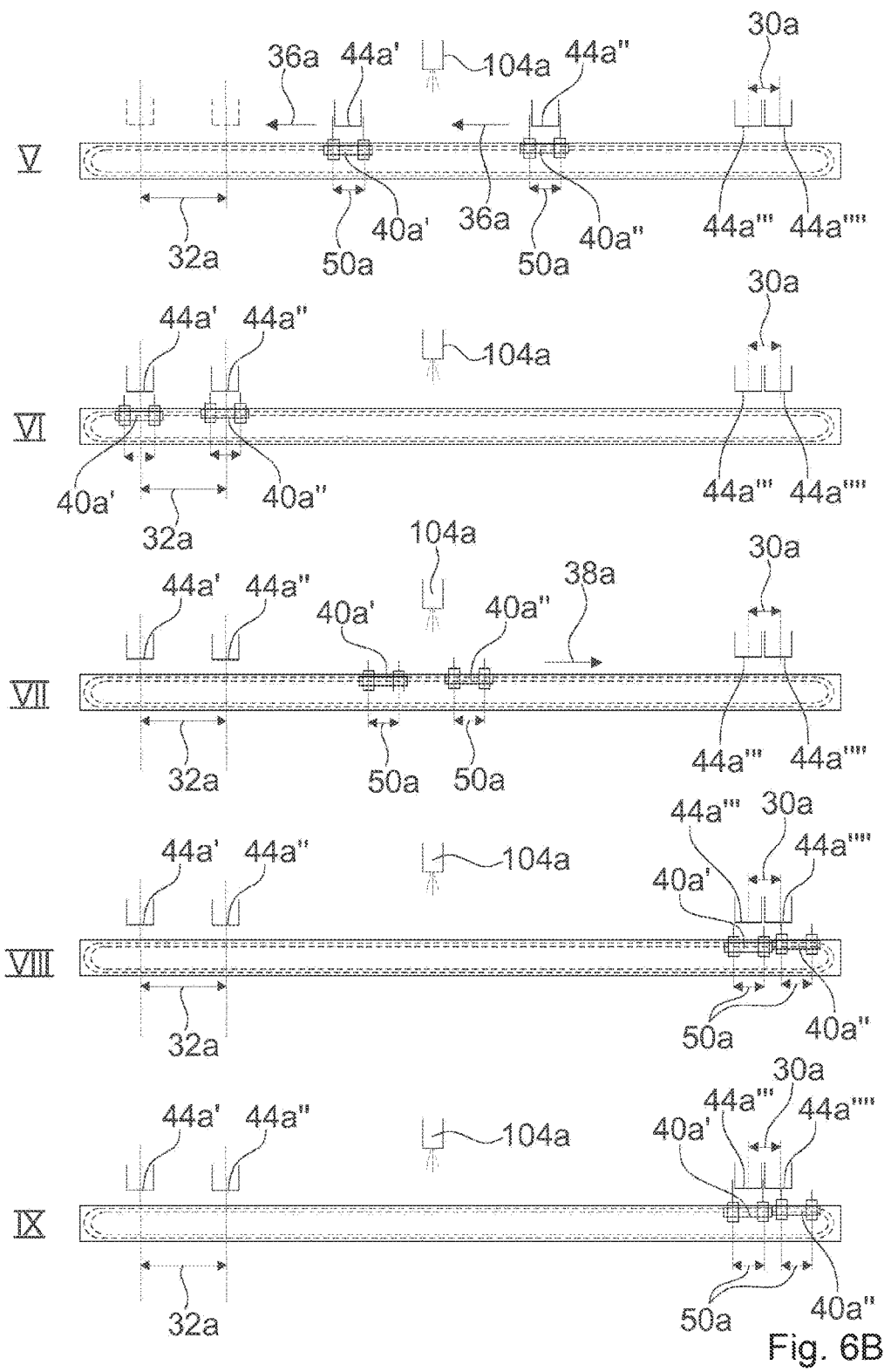
Figure 6C:
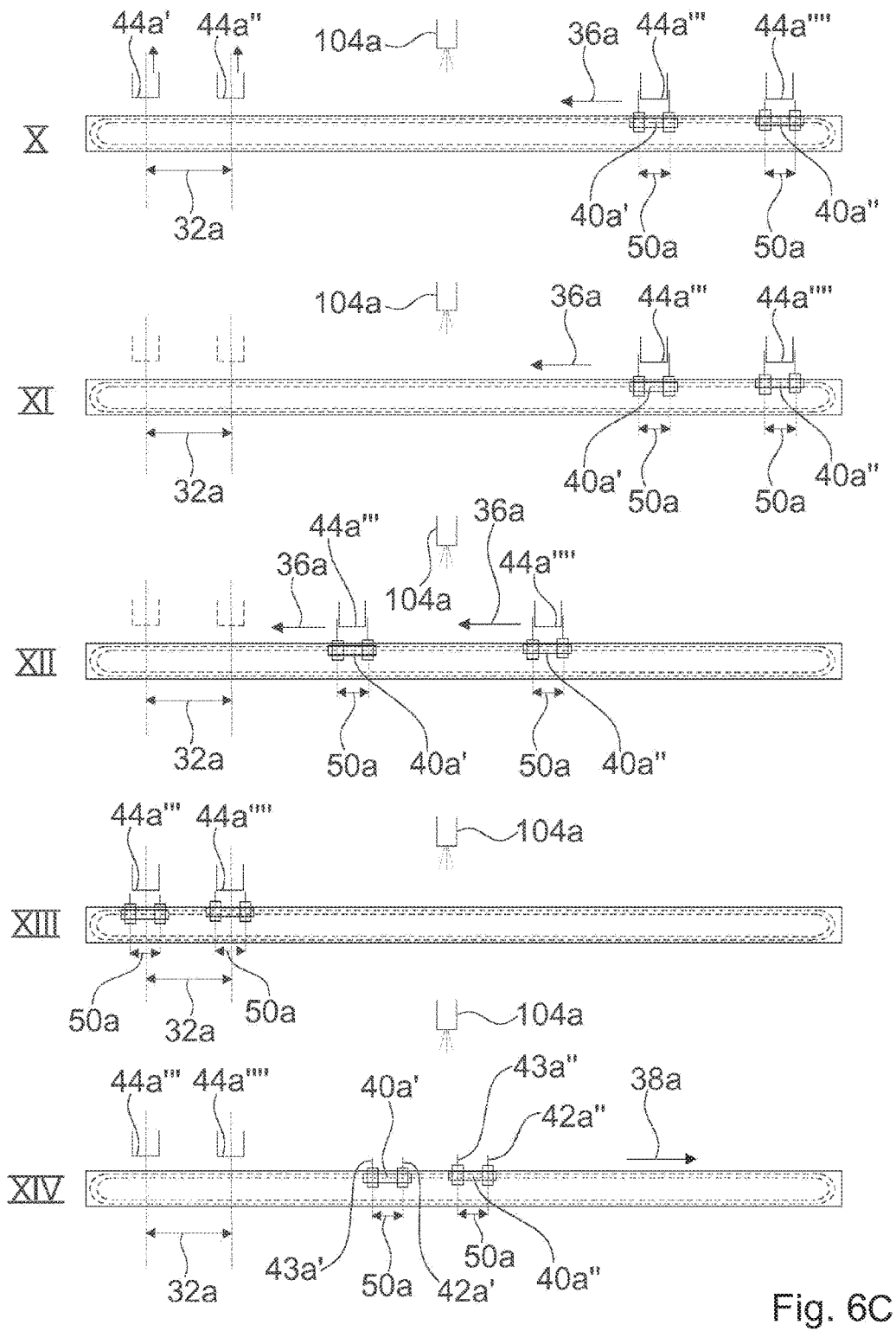

The transporting apparatus 10a is for transferring pack groups 14a along a transporting route 20a from a first pack-group arrangement 22a in a first transporting-route portion 24a into a further pack-group arrangement 26a in a further transporting-route section 28a provided in one method described in the sequence (FIGS. 6A, 6B, and 6C). The pack-group arrangements 22a, 26a are spaced apart internally in each case by different distances 30a, 32a.

The transporting apparatus 10a has a product support 54a formed from a transfer sheet; on which the pack groups 14a rest during transfer so that said pack groups are supported by the product support 54a. The pack groups 14a are formed from cardboard boxes 16a shaped from cardboard blanks 18a. The cardboard blanks 18a are flat blanks in the exemplary embodiment, from which the cardboard boxes 16a are formed by erection, i.e. folding and gluing. In the same manner as described in the sequence, it is also possible with the transporting apparatus 10a to transfer cardboard blanks 18a as well as only partially erected cardboard boxes 16a. It is also possible to use the transporting apparatus 10 for transferring other types of containers, such as particularly cardboard sleeves of wound packs or other comparable containers and items.

Two transporting units 40a', 40a" are independently drivably mounted on a common linear guide 56a in one movement plane 34a along the transporting route 20a between the first transporting-route portion 24a and the further transporting-route portion 28a in a transporting direction 36a and in a return direction 38a opposite to the transporting direction 36a. The movement plane 34a is parallel to the product support 54a. The transporting units 40a', 40a" are driven in each case by a rotating toothed belt 58a', 58a", servo motors that are not depicted in detail being provided for the drive of said transporting units. A control unit 60a controls and regulates the movements of the transporting units 40a', 40a" by means of a suitable actuation of the servo motors.

The transporting units 40a', 40a" have respectively two driving elements 42a', 43a', 42a", 43a" driven in each case by driving means 48a', 48a", which are provided in each case to couple a pack 44a of the pack group 14a to be transferred during the transfer from the first transporting-route portion 24a into the further transporting-route portion 28a with the respective transporting unit 40a', 40a". In so doing, the two driving elements 42a', 43a' of the transporting unit 40a' or the two driving elements 42a", 43a" of the transporting unit 40a" can in each case be coupled in a form-fitting manner to one of the packs 14a to be coupled at opposite ends of the pack 44a in the transporting direction 36a. The driving elements 42a', 42a" are disposed in each case at an end of the transporting units 40a', 40a" that is opposite the transporting direction 36a and thus push the packs 44a in the transporting direction 36a. The driving elements 43a', 43a" are in each case disposed at an end of the transporting units 40a', 40a" oriented in the transporting direction 36a and therefore exert a force opposite to the transporting direction 36a onto the packs 44a, which cause a clamping of the packs 44a between the driving elements 42a', 43a' or respectively driving elements 42a", 43a"; so that a play is prevented in the transporting direction 36a and the packs 44a are transferred in a particularly precise manner.

The driving elements 42a', 43a', 42a", 43a" of each of the transporting units 40a', 40a" are in each case mounted such that, in a force-fitting and/or form-fitting manner, they are coupled to the pack (44a) which is to be coupled to the respective transporting unit (40a', 40a"), and uncoupled therefrom, in one movement (46a), in each case independently of the at least one driving element (42a', 43a', 42a", 43a") of the at least one further transporting unit (40a', 40a"). In so doing, the driving elements 42a', 43a', 42a", 43a" can be driven independently of the position thereof along the transporting route 20a in the coupling movement 46a.

Figure 2:
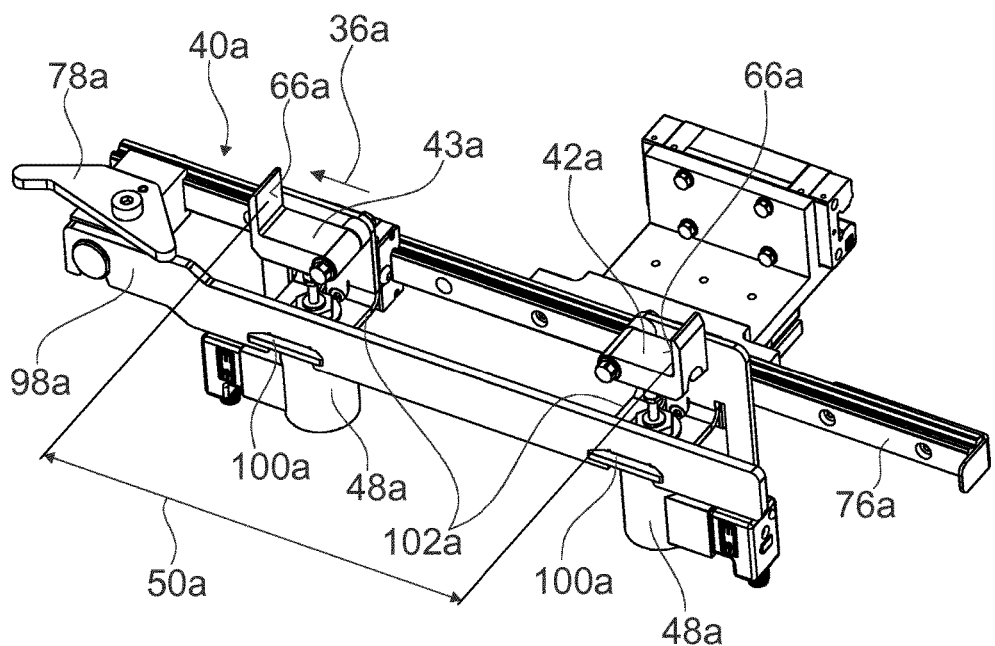
FIG. 2 shows as schematic depiction of a transporting unit of the transporting apparatus.
Figure 3:
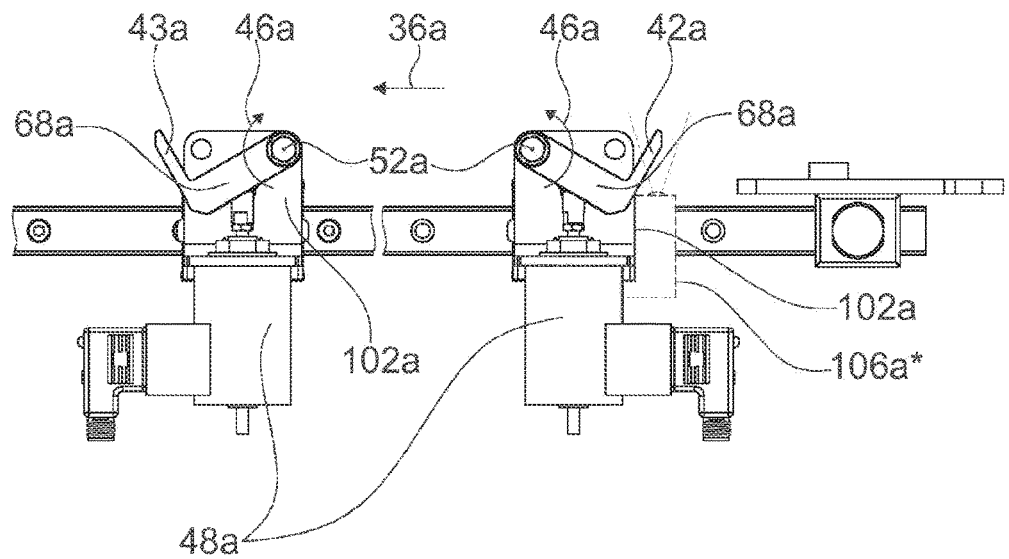
FIG. 3 shows a further view of one of the transporting units of the transporting apparatus.
Figure 4:
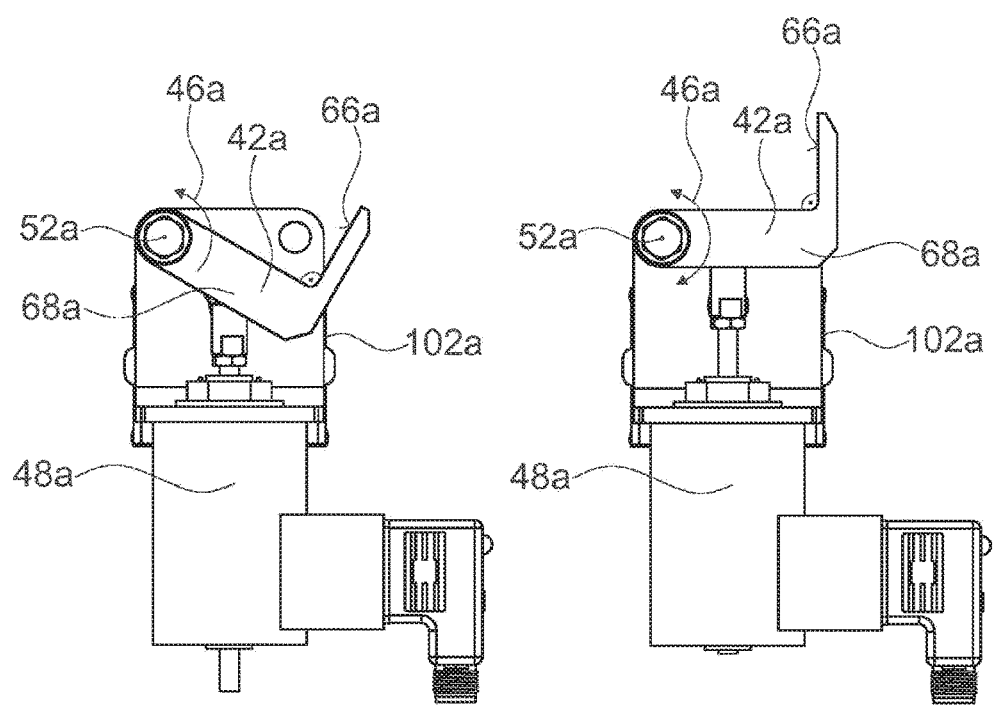
FIG. 4 shows a schematic depiction of a driving element of the transporting apparatus.

The construction of the transporting units 40a is depicted in detail in FIG. 2 to FIG. 4. The transporting units 40a are in each case identically constructed in the example shown; therefore, a differentiation between the transporting units 40a' and 40a" is dispensed with in the sequence. Independently of the packs 44a to be processed, in particular if pack groups are to be transferred, in which the packs have different dimensions, it can be advantageous if the transporting apparatus has a plurality of different transporting units having in each case different constructions. The person skilled in the art will in this case suitably determine the construction of the transporting units. The transporting units 40a have in each case the two active driving means 48a formed from a solenoid, which are provided to drive in each case one of the driving elements 42a, 43a of the respective transporting unit 40a with the coupling movement 46a. The driving elements 42a, 43a belonging in each case to a transporting unit 40a are driven by the driving means 48a as a rule. The driving elements 42a, 43a can alternatively be coupled to the pack 44a in a temporally delayed manner. The driving element 42a disposed at the end of the transporting unit 40a facing away from the transporting direction 36a can, for example, be initially coupled. In a following step, the transporting unit 40a can be moved by several millimeters in the transporting direction 36a at least until the pack 40a rests securely against the coupled driving element 42a. In a following step, the driving element 43a disposed at the end of the transporting unit 40a facing the transporting direction 36a can be coupled. The driving elements 42a, 43a are securely coupled to the pack in this method even if said pack is displaced with respect to an expected target position in the transporting direction. The person skilled in the art will select the suitable method, in particular independently of a positional preciseness of the packs 44a of the pack groups 14a to be transferred. If the driving elements 42a, 43a of a transporting unit 40a are only to be driven synchronously, the construction of the transporting unit 40a can be simplified to the extent that a common driving means drives both driving elements 42a, 43a via a coupling mechanism. The respectively two driving elements 42a, 43a that can be coupled in a form-fitting manner to a pack 44a are mounted on the common transporting unit 40a to respectively one driving base 102a, which is mounted on a bearing track 76a at an adjustable and determinable distance 50a in the transporting direction 36a. The distance 50a is measured between holding surfaces 66a of the driving elements 42a, 43a that face each other and are disposed opposite to each other in each case on the transporting units 40a. The packs 44a are clamped between the holding surfaces 66a. The distance 50a can preferably be adjusted and determined by a format adjustment device 98a, which is adapted to a length of the packs 44a to be transferred. The format adjustment device 98a is set on the respective transporting unit 40a and locked by means of a lock 78a. The format adjustment device 98a engages around projections 100a disposed at the driving base 102a of the respective driving elements 42a, 43a and establishes in this manner the distance 50a between holding surfaces 66a of the driving elements 42a, 43a that face each other. The distance 50a is selected such that it is smaller by a small amount, for example 1 mm, than the length of the packs 44a to be transferred in the transporting direction 36a such that the packs 44a deflect in the transporting direction and are securely clamped. In this case, the format adjustment device has a length that is 1 mm smaller than the length of the packs 44a to be transferred.

FIGS. 3 and 4 show the construction of the driving elements 42a, 43a. The driving elements 42a, 43a are rotatably mounted to the respective transporting units 40a by an axis of rotation 52a that is perpendicular to the transporting direction 36a and parallel to the movement plane 34a in the coupling movement 46a. The coupling movement 46a therefore represents a pivoting movement, which ensures that the driving elements 42a, 43a can be pivoted at intervals between two packs 44a of a pack group 14a. The driving elements 42a, 43a are symmetrically disposed on the transport units 40a in relation to a central plane perpendicular to the transporting direction 36a. Lever arms 68a of the driving elements 42a, 43a point outwards with respect to the central plane of the axes of rotation 52a. The holding surfaces 66a are disposed on the lever arms 68a at a right angle and are oriented in the direction of the packs 44a. By means of the coupling movement 46a, the driving elements 42a, 43a are pivoted symmetrically against the pack 44a during coupling, and the coupled pack 44a is clamped.

In FIG. 3, the transporting unit 40a is depicted comprising an optional sensor 106a*, which is disposed at an end of the driving base 102a of the driving element 42a that is oriented counter to the transporting direction 36a. The sensor 106a* is designed as an optical sensor and detects edges of the packs 44a that are oriented counter to the transporting direction 36a. The sensor 106a* is provided to detect the pack positions. A transporting unit 40a equipped with the sensor 106a* detects packs 44a and or pack positions if said transporting unit moves by a pack 44a in the transporting direction 36a or in the return direction 38a. The transporting unit 40a is coupled to the pack 44a at a position matched to the pack position. The control unit 60a of the transporting apparatus 10a is provided to detect the pack positions and couple the transporting units 40a to the packs 44a at the appropriate positions and to compensate for deviations in the pack positions. The person skilled in the art will determine if it is advantageous to equip the transporting units 40a of the transporting apparatus 10a with sensors 106a*. This depends particularly on how precisely pack positions of the packs 44a of the first pack-group arrangement 22a are to be maintained.

Figure 5:
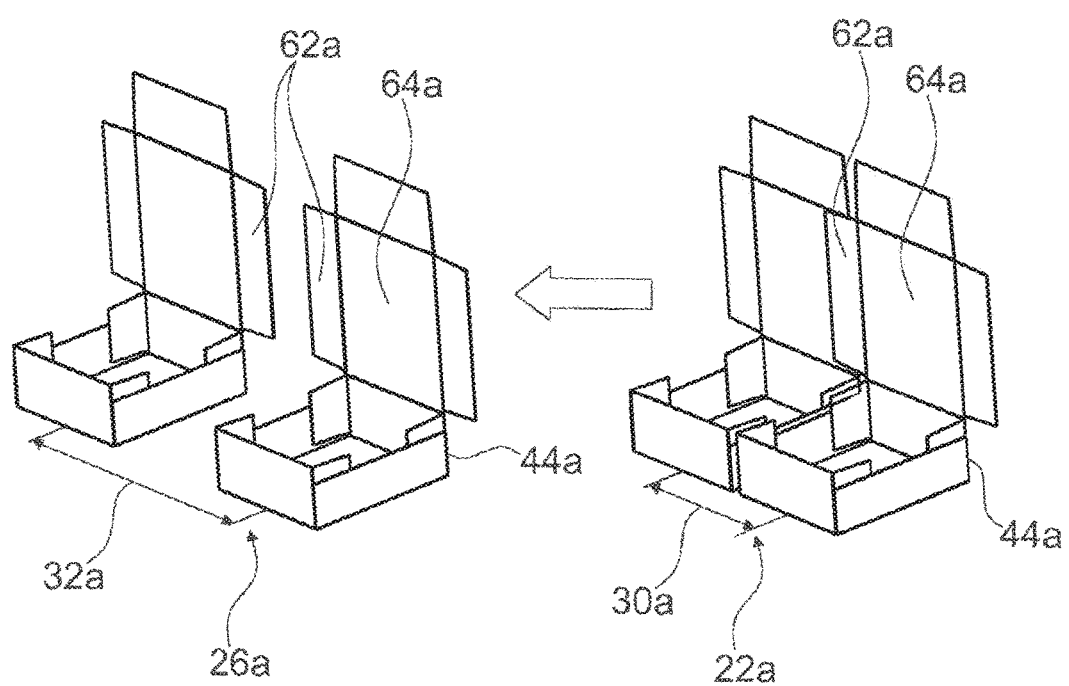
FIG. 5 shows a schematic depiction of a pack group in a shingled and in a non-shingled pack-group arrangement.

FIG. 5 shows how packs 44a in the first pack-group arrangement 22a are spaced apart by different distances in the first spacing 30a and the in the second pack-group arrangement 26a in the further spacing 32a. The packs 44a are disposed in a shingled pack-group arrangement 22a in the first pack-group arrangement 23a, in which flaps 62a of a cover part 64a overlap in the transporting direction 36a of adjacent packs 44a. In so doing, a distance remains between the shingled packs 44a in the transporting direction that is sufficiently large that a driving element 42a can be inserted between the packs 44a. The further pack-group arrangement 26a has a larger spacing 32a, in which the packs 44a are spaced apart in the transporting direction 36a.

FIGS. 6A, 6B, and 6C show in a simplified schematic diagram steps I through XIV of a preferred method for transferring the pack groups 14a. A pack group 14a comprising four packs 44a'-44a"" is transferred in the example described. The method can be adapted independently of the first pack-group arrangement 22a and the further pack-group arrangement 26a, which is to be generated by the transfer. Individual steps of the method can particularly be consolidated. The pack groups 14a are disposed in the first pack-group arrangement 22a in the first transporting-route portion 24a and are transferred into the further pack-group arrangement 26a in the further transporting-route portion 28a, wherein the first pack-group arrangement 22a and the further pack-group arrangement 26a are spaced apart internally in each case by different distances 30a, 32a. The two transporting units 40a', 40a" are independently driven in the common movement plane 34a along the transporting route 20a between the first transporting-route portion 24a and the further transporting-route portion 28a in the transporting direction 36a and in the return direction 38a opposite to the transporting direction 36a. The transporting units 40a', 40a" have in each case driving elements 42a', 43a', 42a", 43a", wherein always two driving elements 42a', 43a', 42a", 43a" disposed on one of the transporting units 40a', 40a" are provided to individually drive a pack 44a'-44a"" of the pack group 14a to be transferred during the transferring from the first transporting-route portion 24a into the further transporting-route portion 28a. The driving elements 42a', 43a', 42a", 43a" are in each case coupled in a force- or form-fitting manner independently of one another to the pack 44a to be coupled to the respective transporting unit 40a', 40a", and/or uncoupled therefrom, in one movement. In one step of the method, in the first transporting-route portion 24a with the pack group 14a in the first pack-group arrangement 22a, two first driving elements 42a', 43a are coupled to a first pack 44a', which is counter to the transporting direction 36a, of the pack group 14a. This pack 44a is then driven in the transporting direction 36a in the direction of the further transporting-route portion 28a; and in a further step of the method, two second driving elements 42a", 43a" are coupled to a second pack 44a", which is counter to the transporting direction 36a, of the pack group 14a, and this second pack 44a is driven in the transporting direction 36a in the direction of the further route portion 28a. In a further step of the method, the two first driving elements 42a', 43a' are uncoupled from the first pack 44a" which is counter to the transporting direction 36a, and the two second driving elements 42a", 43a" from the second pack 44a"" which is counter to the transporting direction 36a upon reaching the further pack-group arrangement 26a in the further transporting-route portion 28a. In a further step of the method, the uncoupled driving elements 42a', 43a', 42a", 43a" are further transferred in the return direction 38a from the further transporting-route portion 28a into the first transporting-rout portion 24a.

The individual steps of the method are described in their sequence:

In a first step, the transporting unit 40a' in the first transporting-route portion 24a, in which the four packs 44a'-44a"" in the first pack-group arrangement 22a are spaced apart internally by the distance 30a, is moved in the movement plane 34a in the transporting direction 36a centrally to the first pack 44a' which is counter to the transporting direction 36a (FIG. 6A, step I). If the transport units 40a' 40a" are equipped with sensors, these are used to match positions of the transporting units 40a', 40a" to pack positions of the packs 44a. In a further step, the driving elements 42a', 43a' are coupled to the pack 44a' in the coupling movement 46a (FIG. 6A, step II). In a further step, the transporting unit 40a' transfers the pack 44a' in the transporting direction 36a in the direction of the further transporting-route portion 28a. The transporting unit 40a" is moved in the first transporting-route portion 24a in the transporting direction 36a centrally with respect to the next pack 44a" which is counter to the transporting direction 36a (FIG. 6A, step III). In a further step, the driving elements 42a", 43a" are coupled to the pack 44a". The transporting unit 40a' transfers the pack 44a' further in the transporting direction 36a in the direction of the transporting-route portion 28a (FIG. 6A, step IV). In a further step, the transporting unit 40a" transfers the pack 44a" in the transporting direction 36a in the direction of the further transporting-route portion 28a. The transporting unit 40a' transfers the pack 44a' further in the transporting direction in the direction of the further transporting-route portion 28a. A glue application means 104a, in this case gluing nozzles of a hot gluing device, is disposed along the transporting route 20a between the transporting-route portions 24a and 28a. While the packs 44a'-44a"" are moved past the glue application means, glue is applied to said packs. The application of glue is used for a later sealing of the packs 44a'-44a"" in the region of the transporting-route portion 28a by a sealer that is not depicted in detail. In the step described here, the pack 44a' has already passed by the glue application means 104a and been provided with glue; the pack 44a" is located counter to the transporting direction 36a still before the glue application means 104a (FIG. 6B, step V). In a further step, the transporting units 40a' and 40a" comprising the packs 44a', 44a" reach target positions in the transporting-route portion 28a, in which the packs 44a', 44a" are spaced apart by further distances 32a of the further pack-group arrangement 26a. The driving elements 42a', 43a' and 42a" and 43a" are uncoupled from the packs 44a' and 44a" (FIG. 6B, step VI). In a further step, the transporting units 40a' and 40a" are transferred in the return direction 38a into the first transporting-route portion (FIG. 6B, step VII). In a further step, the transporting unit 40a' in the first transporting-route section 24a is moved centrally with respect to the third pack 44a'" counter to the transporting direction 36a (FIGS. 6a, 6b, and 6c, step VIII). In a further step, the driving elements 42a', 43a' are coupled to the pack 44a'" in the coupling movement 46a (FIG. 6B, step IX). In a further step, the transporting unit 40a' transfers the pack 44a'" in the transporting direction in the direction of the further transporting-route portion 28a. The transporting unit 40a" is moved in the first transporting-route portion 24a in the transporting direction 36a centrally with respect to the fourth pack 44a"" counter to the transporting direction 36a. At the same time, the packs 44a', 44a" are removed from the transporting-route portion 28a by a further transporting unit that is not depicted here in detail (FIG. 6C, step X). In a further step, the driving elements 42a", 43a" are coupled to the pack 44a"" in the coupling movement 46a. The transporting unit 40a' transfers the pack 44a'" further in the transporting direction 36a in the direction of the further transporting-route portion 28a (FIG. 6C, step XI). In a further step, the transporting unit 40a" transfers the pack 44a"" in the transporting direction 36a in the direction of the further transporting-route portion 28a. The transporting unit 40a' transfers the pack 44a'" further in the transporting direction 36a in the direction of the further transporting-route portion 28a (FIG. 6C, step XII). In a further step, the transporting units 40a' and 40a" comprising the packs 44a'", 44a"" reach target positions in the transporting-route portion 28a, in which the packs 44a'-44a"" are spaced apart by the further distance 32a of the further pack-group arrangement 26a. The driving elements 42a', 43a' and 42a", 43a" are uncoupled from the packs 44a'" and 44a"" (FIG. 6C, step XIII). In a further step, the transport units 40a' and 40a" are transferred in the return direction 38a into the first transporting-route portion 24a. The packs 44a'-44a"" are transferred from the first pack-group arrangement 22a in the first transporting-route portion 24a into the further pack-group arrangement 26a in the further transporting rout portion 28a (FIG. 6C, step XIV).

This method can be further continued in the same manner independently of the number of packs 44a to be transferred.

Further exemplary embodiments of the invention are shown in the FIGS. 7 to 15. The following descriptions and the drawings limit themselves substantially to the differences between the exemplary embodiments, wherein, with regard to components that are designated similarly, in particular with regard to components with the same reference signs, reference can basically be made to the drawings and/or the description of the other exemplary embodiments, particularly of FIGS. 1 to 6. To distinguish between the exemplary embodiments, the letter a is added to the reference signs of the exemplary embodiment in FIGS. 1 to 6. In the exemplary embodiments of FIGS. 7 to 15, the letter a is replaced by the letters b to g.

Figure 7:
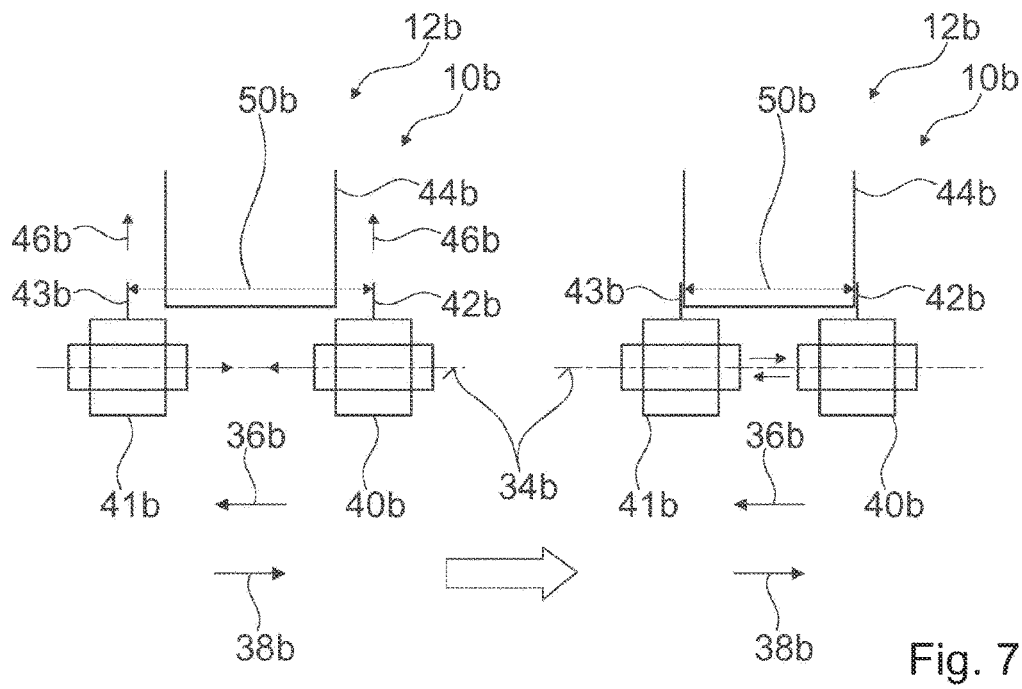
FIG. 7 shows a schematic depiction of a transporting apparatus according to the invention in a second exemplary embodiment.

FIG. 7 shows a schematic depiction of a section of an inventive transporting apparatus 10b for a packaging machine 12b in a second exemplary embodiment. The transporting apparatus 10b of the second exemplary embodiment is different from the transporting apparatus 10a of the first exemplary embodiment particularly by the fact that respectively two driving elements 42b, 43b that be coupled to a pack 44b in a form-fitting manner can be driven independently in the transporting direction 36b. A distance 50b between the driving elements 42b, 43b can be freely adjusted by the driving elements 42b, 43b being suitably driven. Packs 44b having a different length in the transporting direction 36b can be transferred without a format changeover being necessary by a user. It is likewise possible that a length of packs 44b consecutive in the transporting direction is different. The driving elements 42b, 43b are mounted so as to be independently driveable on respectively independent transporting units 40b, 41b, which are mounted in a common movement plane 34b along a transporting route, which is not depicted in this example, in the transporting direction 36b and in a return direction 38b counter to the transporting direction 36b. A coupling movement about an axis of rotation can be eliminated in this exemplary embodiment due to the driving elements that can be driven independently in the transporting direction 36b. In order to couple one of the packs 44b to the driving elements 42b, 43b in a form-fitting manner, the driving elements 42b, 43b are initially positioned in front of and behind the pack 44b at a distance 50b, which is somewhat larger, e.g. 1-5 mm, than the length of the pack 44b in the transporting direction 36b. The driving elements 42b, 43b are then extended in the direction of the pack 44b in the coupling movement 46b. The distance 50b between the driving elements 42b, 43b is subsequently reduced to the extent that the driving elements 42b, 43b couple and clamp the pack 44b in a form-fitting manner. This reduction in the distance 50b by moving the transporting units 40b, 41b replaces the clamping by the rotating coupling movement 46a of the first exemplary embodiment.

Figure 8:
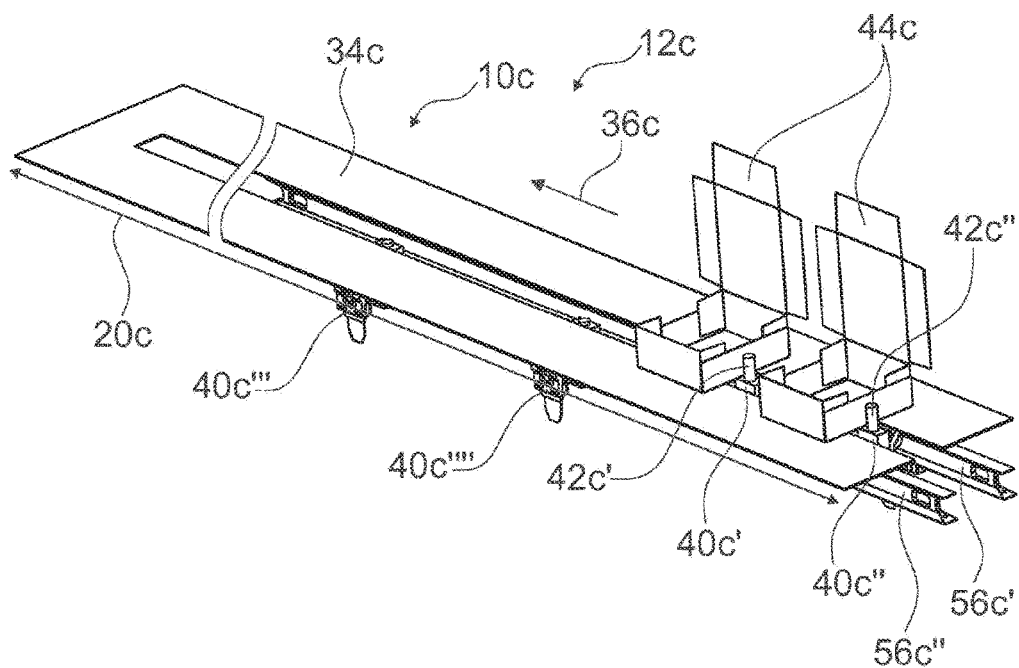
FIG. 8 shows a schematic depiction of a transporting apparatus according to the invention in a third exemplary embodiment.
Figure 9:
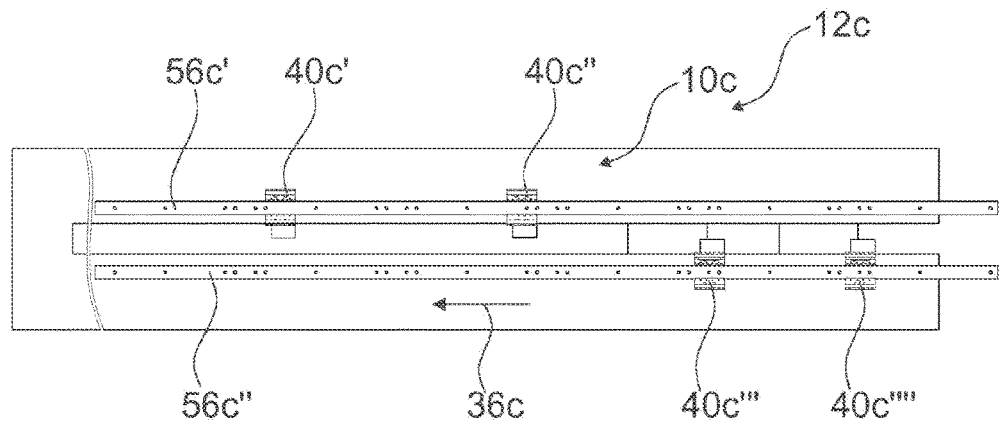
FIG. 9 shows a further depiction of the transporting apparatus according to the invention of the third exemplary embodiment.
Figure 10:
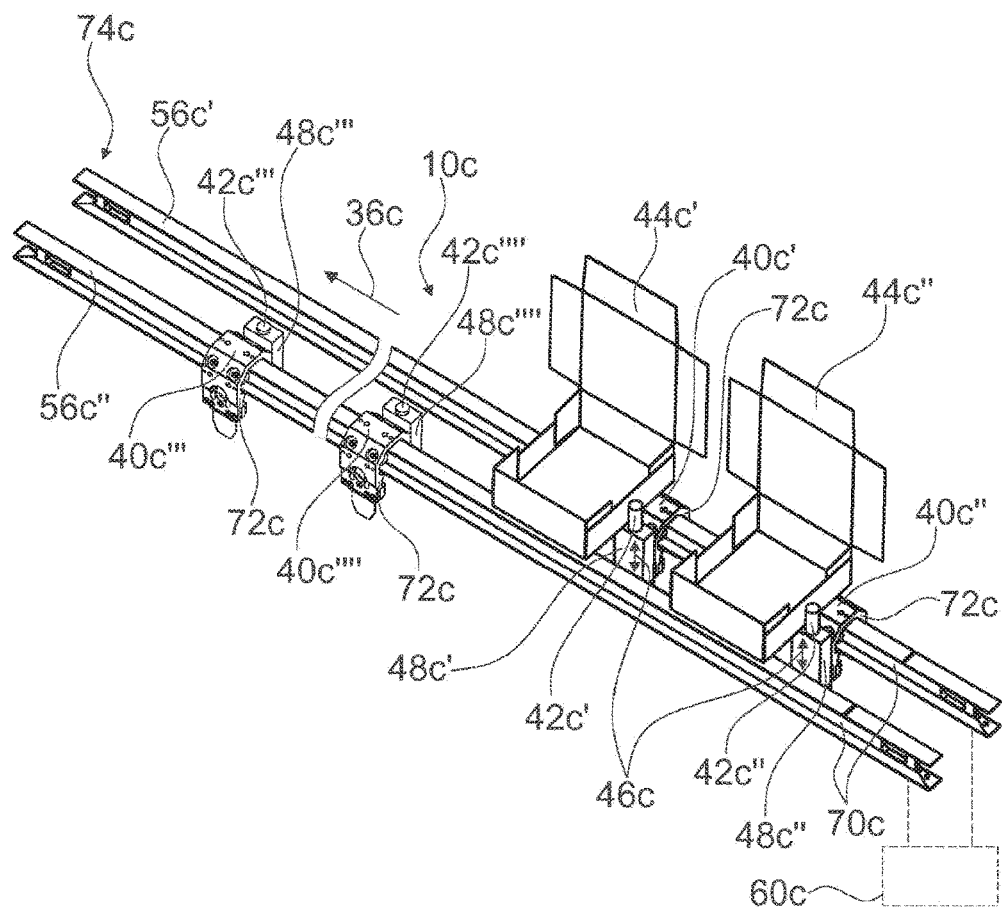
FIG. 10 shows a third depiction of the transport apparatus according to the invention of the third exemplary embodiment.

FIGS. 8 to 10 show a schematic depiction of a section of an inventive transporting apparatus 10c for a packaging machine 12c in a third exemplary embodiment. The transporting apparatus 10c differs from the transporting apparatus 10b of the previous exemplary embodiment particularly by the fact that a driving element 42c'-42c'''' is disposed in each case on the transporting units 40c'-40c''''. The driving elements 42c'-42c'''' are provided to couple respectively one pack 44c to a respective transporting unit 40c'-40c'''' in a form-fitting manner. Clamping of packs 44c between two driving elements as in the previous exemplary embodiments is eliminated. Respectively one of the driving elements 42c-42c'''' pushes one of the packs 44c in the transporting direction 36c. The transporting apparatus 10c can therefore with the four driving elements 42c'-42c'''' simultaneously transfer four of the packs 44c'-44c''''. In contrast, a position of the packs 44c'-44c'''' can only be ensured by the driving elements 42c'-42c'''' counter to the transporting direction 36c. Packs 44c'-44c'''' having different lengths in the transporting direction 36c can be transferred without a format changeover being necessary by a user. It is likewise possible that a length of packs 44c'-44c'''' that are consecutive in the transporting direction 36c differs.

The four transporting units 40c'-40c'''' are mounted in an independently driveable manner in a common movement plane 34c along a transporting route 20c in the transporting direction 36c and in a return direction 38c counter to the transporting direction 36c. The transporting units 40c', 40c'' are mounted on a linear guide 56c' and the transporting units 40c''', 40c'''' are mounted along the common movement plane 34c. The transporting units 40c'-40c'''' form together with the linear guides 56c' and 56c'' a linear motor system 74c. Respectively one secondary part 72c of the linear motor system 74c, which part is designed as a permanent magnet, is integrated into the transporting units 40c'-40c''''. The linear guides 56c' and 56c'' have primary parts 70c of the linear motor system 74c, said primary parts being formed from windings and a displacement measuring system. A control unit 60c actuates the linear motor system 74c in a suitable manner so that the transporting units 40c'-40c'''' can be freely positioned along the transporting route. Alternatively to the linear motor system 74c, the transporting units 40c'-40c'''' could, as in the first exemplary embodiment, be driven by rotating toothed belts. On the transporting units 40c'-40c'''', respectively one of the driving elements 42c'-42c'''' is mounted on a driving means 48c'-48c'''' formed from respectively one solenoid. The driving elements 42c'-42c'''' can be driven by the driving means 48c'-48c'''' in one coupling movement 46c perpendicular to the movement plane 34c.

The transporting units 40c'-40c'''' transferring respectively one pack 44c can be driven especially flexibly along the transporting-route 20c due to the mounting of the transporting units 40c'-40c'''' on the two linear guides 56c' and 56c''. In particular, a collision cannot take place between the transporting units 40c'-40c'' and the transporting units 40c'''-40c''''. It is particularly possible, to drive the transporting units 40c'-40c'' in the return direction in order to return to a transporting-route portion 24c, whereas the transporting units 40c'''-40c'''' or the transporting units 40c'-40c'' are driven in the transporting direction 36a in order to transport packs 44c in the direction of a transporting-route portion 28c.

Figure 11:
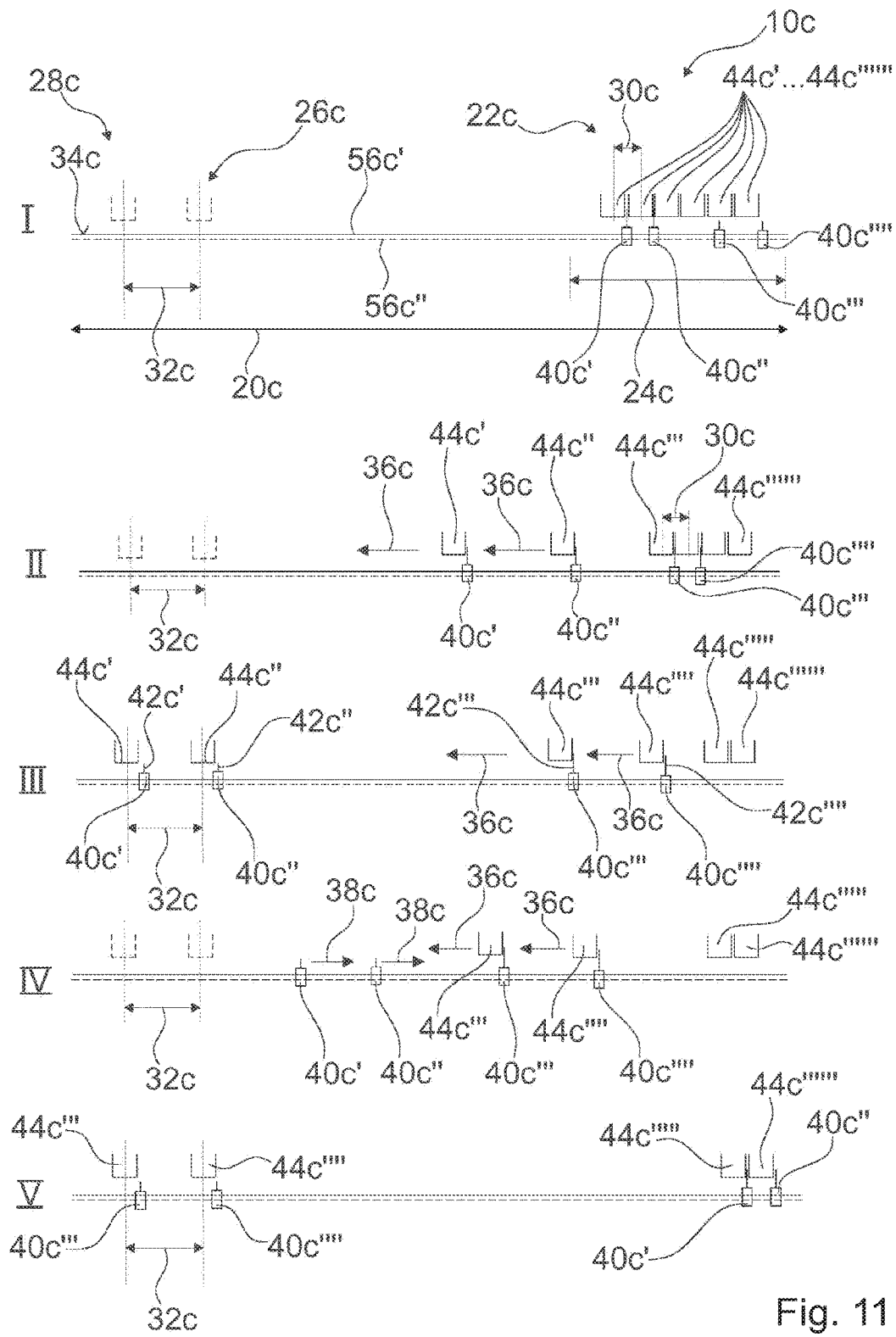
FIG. 11 shows a depiction of steps I through V of a preferred method for transferring a pack group with the transporting apparatus of the third exemplary embodiment.

FIG. 11 shows in a simplified schematic diagram the steps I through V of a preferred method for transferring pack groups 14c with the transporting apparatus 10c in the third exemplary embodiment. The individual steps of the method are described in the following sequence:

In a first step, the transporting units 40c' and 40c'' in the first transporting-route portion 24c, in which six packs 44c'-44c'''''' in a first pack-group arrangement 22c are spaced apart internally by the distance 30c, are moved in the movement plane 34c in the transporting direction 36c to the end of the first pack 44c' or respectively second pack 44c'' which is oriented counter to the transporting direction 36c, and the driving elements 42c', 42c'' are coupled to the packs 44c', 44c'' (FIG. 11, step I). In a further step, the transporting units 40c', 40c'' transfer the packs 44c', 44c'' in the transporting direction 36c in the direction of the further transporting-route portion 28c; whereas the transporting unit 40c''' and 40c'''' are moved in the movement plane 34c in the transporting direction 36c to ends, which are oriented counter to the transporting direction 36c, of the next or respectively next-but-one packs 44c''', 44c'''' that are counter to the transporting direction 36c and the driving elements 42c''', 42c'''' are coupled to the packs 44c''', 44c'''' (FIG. 11, step II). In a further step, the transporting units 40c''', 40c'''' transfer the packs 44c''', 44c'''' in the transporting direction 36c in the direction of the further transporting-route portion 28c. The transporting units 40c' and 40c'' comprising the packs 44c', 44c'' reach target positions in the transporting-route portion 28c, in which the packs 44c'-44c'''' are to be spaced apart internally by a further distance 32c of a further pack-group arrangement 26c. The driving elements 42c', 42c'' are uncoupled from the packs 44c' and 44c'' (FIG. 11, step III). In a further step, the transporting units 40c' and 40c'' are transferred in the return direction 38c into the first transporting-route portion; while the transporting units 40c''' and 40c'''' comprising the packs 44c''' and 44c'''' still move in the transporting direction 36c. This is possible without a collision because the transporting units 40c' and 40c'' are mounted on the linear guide 56c' and the transporting units 40c''' and 40c'''' on the linear guide 56c''. The packs 44c', 44c'' are removed from the transporting-route portion 28c by a further transporting unit that is not depicted in detail here (FIG. 11, step IV). In a further step, the transporting units 40c''' and 40c'''' comprising the packs 44c''', 44c'''' reach the target positions in the transporting-route portion 28c, in which the packs 44c'-44c'''' are to be spaced apart internally by the further distance 32c of the further pack-group arrangement. 26c. The driving elements 42c''', 42c'''' are uncoupled from the packs 44c''' and 44c''''. At the same time, the driving elements 42c', 42c'' are coupled to the packs 44c'''' and 44c'''''. Subsequently, the transporting units 40c' and 40c'' transfer the packs 44c'''' and 44c''''' in the same manner into the pack-group arrangement 26c in the transporting-route portion 28c (FIG. 11, step V).

Figure 12:
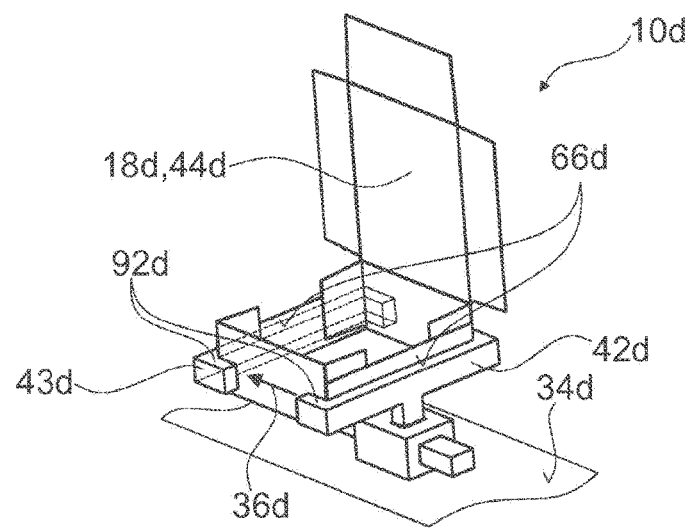
FIG. 12 shows a depiction of a transporting unit of a transporting apparatus of a fourth exemplary embodiment.

FIG. 12 shows a schematic depiction of a section of a transporting apparatus 10d according to the invention in a fourth exemplary embodiment. The transporting apparatus 10d differs from the transporting apparatus 10b of the second exemplary embodiment particularly by the fact that driving elements 42d, 43d engage around a pack 44d. The driving elements 42d, 43d can particularly hold packs 44d that have been folded from a cardboard blank 18d and are not yet glued, so that the pack 44d is prevented from folding up. For this purpose, the driving elements 42d, 43d have two holding edges 92d, which engage around the pack 44d, in addition to holding fingers comprising holding surfaces 66d that are oriented perpendicularly to a transporting direction 36d at a distance which corresponds to a width of a pack 44d that is measured perpendicularly to the transporting direction 36d and parallel to a movement plane 34d.

Figure 13:
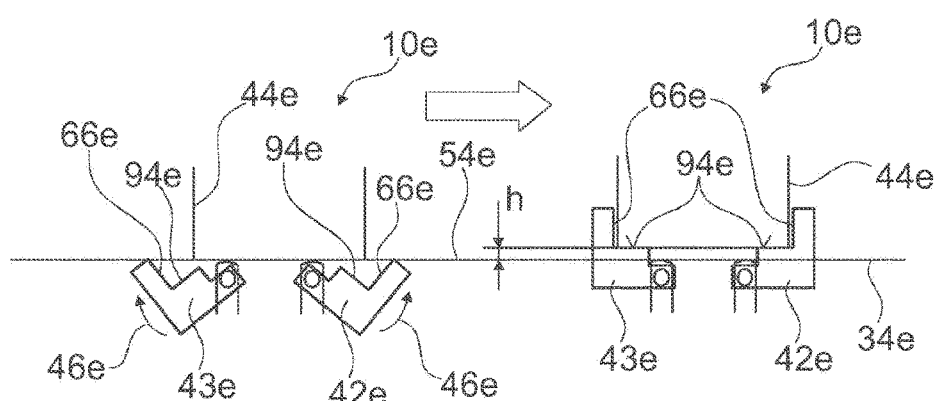
FIG. 13 shows a depiction of a transporting unit of a transporting apparatus of a fifth exemplary embodiment.

FIG. 13 shows a schematic depiction of a section of a transporting apparatus 10e according to the invention in a fifth exemplary embodiment. The transporting apparatus 10e differs from the transporting apparatus 10a of the first exemplary embodiment particularly by the fact that driving elements 42e, 43e lift a pack 44e when clamping with a coupling movement 46e by a height h over a product support 54e. To this end, the driving elements 42e, 43e have support surfaces 94e in addition to holding surfaces 66e, said support surfaces being disposed parallel to a movement plane 34e in a coupled operating state and are spaced farther apart from a movement plane 34e than the product support 54e by as small amount, for example 1-3 mm. The driving elements 42e, 43e carry the pack 44e during the transfer and frictional contact of the pack 44e with the product support 54e is prevented. The driving elements 42e, 43e of this exemplary embodiment are particularly suited to packs 44e having a tacky surface or packs 44e which can be slightly damaged when pushed over the product support 54e.

Figure 14:
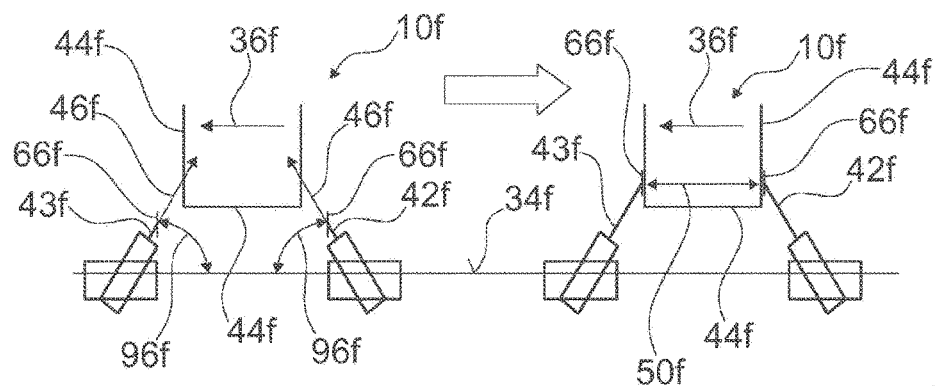
FIG. 14 shows a depiction of a transporting unit of a transporting apparatus of a sixth exemplary embodiment and FIG. 15 shows states I and II of an articulation element that is part of a driving element of a transporting apparatus in a seventh exemplary embodiment comprising the articulation element for driving a coupling movement.

FIG. 14 shows as schematic depiction of a section of a transporting apparatus 10f according to the invention in a sixth exemplary embodiment. The transporting apparatus 10f differs from the transporting apparatus 10a of the first exemplary embodiment particularly by the fact that driving elements 42f, 43f are mounted so that they can be driven in a coupling movement 46f that is inclined at an angle 96f with respect to a movement plane 34f The driving elements 42f, 43f are symmetrically disposed in relation to a central plane perpendicular to a transporting direction 36f, and the coupling movements 46f are inclined symmetrically to the central plane. The coupling movement 46f thus causes a reduction in the distance 50f between holding surfaces 66f of the driving elements 42f, 43f, so that the coupling movement 46f is suited to clamping a pack 44f just as the rotating coupling movement 46a of the first exemplary embodiment.

Figure 15:
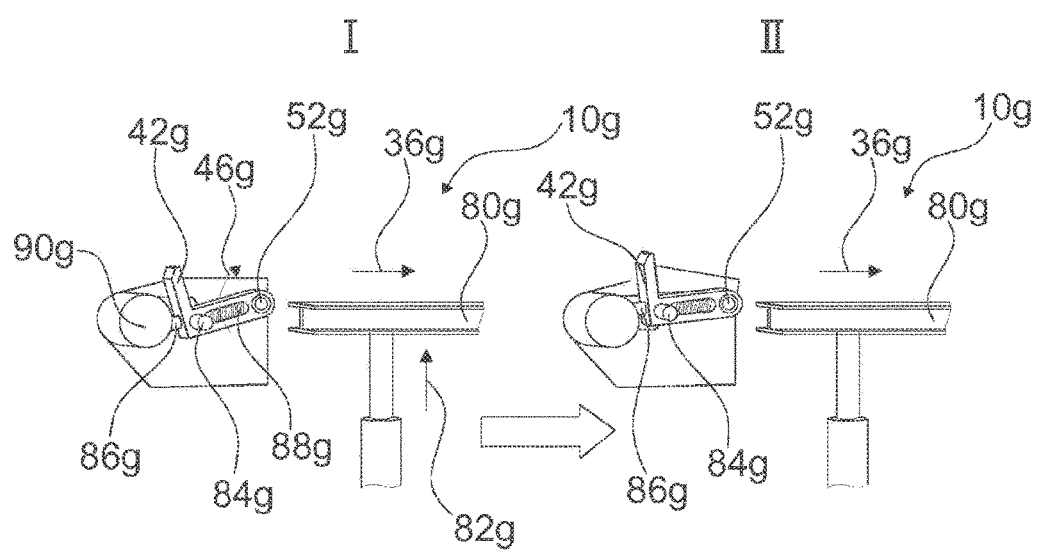

FIG. 15 shows a depiction of a driving element 42g of a transporting apparatus 10g in a seventh exemplary embodiment comprising an articulation element 80g for driving a coupling movement 46g. FIG. 15 shows states I and II of the articulation element 80g. The articulation element 80g is designed as a rail that is perpendicular to a transporting direction 36g and can be displaced in an articulation movement 82g. The driving element 42g has a transmitting element 84g in a radius of an axis of rotation 52g, said transmitting element engaging in a rail-shaped recess of the articulation element and is guided by the same in the direction of the articulation movement 82g. If the articulation element 80g moves in the articulation movement 82g, the driving element 42g pivots in the coupling movement 46g into a coupled state (FIG. 15, state II). If the articulation element 80g moves counter to the articulation movement 82g, the driving element 42g pivots counter to the coupling movement 46g into an uncoupled state (FIG. 15, state I). The driving element 42g furthermore has a detent nose 86g, which is deflected by a detent spring 88g in the direction of a detent 90g. The detent nose 86g has the effect that the driving element 42g engages in both the decoupled and the coupled position and maintains this state without the effect of the articulation element 80g. The driving element 42g together with the articulation element 80g can be used in further exemplary embodiments instead of an active driving means, which is disposed on the transporting units. In this case an energy supply, such as, for example, a current supply, to the transport units can be eliminated.

The invention claimed is:

1. A transporting apparatus for a packaging machine (12a-c) for transferring pack groups (14a; 14c) along a transporting route (20a; 20c) from at least a first pack-group arrangement (22a; 22c) in a first transporting-route portion (24a; 24c) into at least one further pack-group arrangement (26a; 26c) in at least one further transporting-route portion (28a; 28c), wherein the first pack-group arrangement (22a; 22c) and the at least one further pack-group arrangement (26a; 26c) are spaced apart internally in each case by different distances (30a; 30c; 32a; 32c), having at least two transporting units (40a, 40a', 40a''; 40b; 40c'-40c''''), which can be driven independently in a movement plane (34a-f) along the transporting route (20a; 20c), at least between the first transporting-route portion (24a; 24c) and the further transporting-route portion (28a; 28c), in a transporting direction (36a-d; 36f-g) and in a return direction (38a-c) which is counter to the transporting direction (36a-d; 36f-g), wherein the transporting units (40a, 40a', 40a"; 40b; 40c'-40c"") each have at least one driving element (42a, 42a', 42a", 43a, 43a', 43a"; 42b, 43b; 42c'-42c"", 42d, 43d; 42e, 43e; 42f; 43f; 42g), by means of which, in at least one operating state, the respective transporting unit (40a, 40a', 40a"; 40b; 40c'-40c"") is coupled to a pack (44a, 44a'-44a"", 44b; 44c, 44c'-44c"", 44d-f) of the pack group (14a; 14c) which is to be transferred, at least during transfer from the first transporting-route portion (24a; 24c) into the at least one further transporting-route portion (28a; 28c), characterized in that the driving elements (42a, 42a', 42a", 43a, 43a', 43a"; 42b, 43b; 42c'-42c"", 42d, 43d; 42e, 43e; 42f; 43f; 42g) are mounted on the transporting units (40a, 40a', 40a"; 40b; 40c'-40c"") in each case such that, in a force-fitting and/or form-fitting manner, the driving elements (42a, 42a', 42a", 43a, 43a', 43a"; 42b, 43b; 42c'-42c"", 42d, 43d; 42e, 43e; 42f; 43f; 42g) can be coupled to the pack (44a, 44a'-44a"", 44b; 44c, 44c'-44c"", 44d-f) which is to be coupled to the respective transporting unit (40a, 40a', 40a"; 40b; 40c'-40c""), and uncoupled therefrom, in a coupling movement (46a-c; 46e-g) in each case independently of the at least one driving element (42a, 42a', 42a", 43a, 43a', 43a"; 42b, 43b; 42c'-42c"", 42d, 43d; 42e, 43e; 42f; 43f; 42g) of the at least one further transporting unit (40a, 40a', 40a"; 40b; 40c'-40c""), wherein the driving elements (42a, 42a', 42a", 43a, 43a', 43a"; 42b, 43b; 42c'-42c"", 42d, 43d, 42e, 43e, 42f, 43f, 42g) are configured to be driven independently of the position thereof along the transporting route (20a, 20c) in the coupling movement (46a-c; 46e-g), and wherein the transporting units (40a, 40a', 40a"; 40b; 40c'-40c"") have in each case at least one active driving means (48a', 48a"; 48c'-48c""), which drives the at least one driving element (42a, 42a', 42a", 43a, 43a', 43a"; 42b, 43b; 42c'-42c) of the respective transporting unit (40a, 40a', 40a"; 40b; 40c'-40c"") with the coupling movement (46a; 46c).

2. The transporting apparatus according to claim 1, characterized in that respectively two driving elements (42a, 42a', 42a", 43a, 43a', 43a"; 42b, 43b; 42d, 43d; 42e, 43e; 42f; 43f) can be coupled in a form-fitting manner to one of the packs (44a, 44a'-44a"", 44b; 44d-f) at opposite ends of the pack (44a, 44a'-44a"", 44b; 44d-f) in the transporting direction (36a-b; 36d; 36f-g).

3. The transporting apparatus according to claim 2, characterized in that the two driving elements (42b, 43b) which can be coupled in each case in a form-fitting manner to a pack (44b) in the transporting direction (36b) are configured to be independently driven.

4. The transporting apparatus at least according to claim 2, characterized in that the respectively two driving elements (42a, 42a', 42a", 43a, 43a', 43a") that are configured to be coupled to a pack (44a, 44a'-44a"") in a form-fitting manner are mounted on a common transporting unit (40a, 40a', 40a") at a distance (50a) that can be adjusted in the transporting direction (36a).

5. The transporting apparatus according to claim 1, characterized in that the driving elements (42a, 42a', 42a", 43a, 43a', 43a"; 42e, 43e; 42g) on the transporting units (40a, 40a', 40a") are rotatably mounted about an axis of rotation (52a; 52g) in the coupling movement (46a; 46e; 46g) that is perpendicular to the transporting direction (36a; 36g) and parallel to the movement plane (34a; 34e).

6. A packaging machine (12a-c) comprising a transporting apparatus (10a-g) according to claim 1.

7. A method for transferring pack groups (14a; 14c) along a transporting route from at least a first pack group arrangement (22a; 22c) in a first transporting-route portion (24a; 24c) into at least one further pack-group arrangement (26a; 26c) in at least one further transporting-route portion (28a; 28c), wherein the first pack-group arrangement (22a; 22c) and the at least one further pack-group arrangement (26a; 26c) are spaced apart internally in each case by different distances (30a; 30c; 32a; 32c), the method comprising independently driving at least two transporting units (40a, 40a', 40a"; 40b; 40c'-40c"") in a common movement plane (34a-f) along the transporting route (20a; 20c), at least between the first transporting-route portion (24a; 24c) and the further transporting-route portion (28a; 28c), in a transporting direction (36a; 36c) and in a return direction (38a; 38c) which is counter to the transporting direction (36), and wherein the transporting units (40a, 40a', 40a"; 40c'-40c"") have in each case at least one driving element (42a, 42a', 42a", 43a, 43a', 43a"; 42c'-44c""), by means of which, a pack (44a, 44a'-44a"", 44c, 44c'-44c""") of the pack group to be transferred is individually driven at least during the transfer from the first transporting-route portion (24a; 24c) into the at least one further transporting-route portion (28a; 28c), and coupling the driving elements (42a, 42a', 42a", 43a, 43a', 43a"; 42c'-42c"") of the transporting units (40a, 40a', 40a"; 40c-40c"") in a force- and/or form-fitting manner to the pack (44a, 44a'-44a"", 44c, 44c'-44c""") which is to be coupled to the transporting units (40a, 40a', 40a"; 40c'-40c""), and/or uncoupling the driving elements therefrom, in a coupling movement (46a; 46c), in each case independently of one another, and wherein the driving elements (42a, 42a', 42a", 43a, 43a', 43a"; 42b, 43b; 42c'-42c"", 42d, 43d; 42e, 43e; 42f; 43f; 42g) are configured to be driven independently of the position thereof along the transporting route (20a; 20c) in the coupling movement (46a-c; 46e-g), and wherein the transporting units (40a, 40a', 40a"; 40b; 40c'-40c"") have in each case at least one active driving means (48a', 48a"; 48c'-48c""), which drives the at least one driving element (42a, 42a', 42a", 43a, 43a', 43a"; 42b, 43b; 42c'-42c) of the respective transporting unit (40a, 40a', 40a"; 40b; 40c'-40c"") with the coupling movement (46a; 46c).

8. The method according to claim 7, characterized in that, in a step of the method in the first transporting-route portion (24a) with the pack group (14a) in the first pack-group arrangement (22a), at least one first driving element (42a', 43a') is coupled to a first pack (44a', 44a''') on a side of the first pack opposite the transporting direction (36a) of the pack group (14a); and this pack (44a', 44a''') is driven in the transporting direction (36a) in the direction of the further transporting-route portion (28a); and in a further step of the method, at least one second driving element (42a", 43a") is coupled to a second pack (44a", 44a"") on a side of the second pack opposite the transporting direction (36a) of the pack group (14a) and this second pack (44a", 44a"") is driven in the transporting direction (36a) in the direction of the further transporting-route portion (28a).

9. The method according to claim 8, characterized in that, in a further step of the method, the at least one first driving element (42a', 43a') is uncoupled from the first pack (44a', 44a''') and the at least one second driving element (42a", 43a″) from the second pack (44a″, 44a‴″) upon reaching the further pack-group arrangement (26a) in the further transporting-route portion (28a).

10. The method according to claim 9, characterized in that, in a further step of the method, the uncoupled driving elements (42a′, 43a′, 42a″, 43a″) are transferred in a return direction (38a) from the further transporting-route portion (28a) into the first transporting-route portion (24a).

* * * * *